(12) United States Patent
Scarinci et al.

(10) Patent No.: US 8,881,531 B2
(45) Date of Patent: Nov. 11, 2014

(54) GAS TURBINE ENGINE PREMIX INJECTORS

(75) Inventors: Thomas Scarinci, Mont-Royal (CA); Kenneth James Young, Derby (GB)

(73) Assignee: Rolls-Royce Power Engineering Plc, Derby (GB)

( * ) Notice: Subject to any disclaimer, the term of this patent is extended or adjusted under 35 U.S.C. 154(b) by 1529 days.

(21) Appl. No.: 11/639,379

(22) Filed: Dec. 14, 2006

(65) Prior Publication Data
US 2007/0151248 A1 Jul. 5, 2007

Related U.S. Application Data

(60) Provisional application No. 60/750,168, filed on Dec. 14, 2005.

(51) Int. Cl.
| | | |
|---|---|---|
| *F02C 1/00* | (2006.01) | |
| *F23R 3/34* | (2006.01) | |
| *F23R 3/14* | (2006.01) | |
| *F23R 3/28* | (2006.01) | |
| *F23R 3/36* | (2006.01) | |

(52) U.S. Cl.
CPC . *F23R 3/346* (2013.01); *F23R 3/14* (2013.01); *F23R 3/286* (2013.01); *F23R 3/36* (2013.01)
USPC ............ 60/737; 60/748; 60/740; 60/739

(58) Field of Classification Search
USPC .................. 60/737, 740, 739, 748, 746
See application file for complete search history.

(56) References Cited

U.S. PATENT DOCUMENTS

| | | | | |
|---|---|---|---|---|
| 2,850,875 | A | * | 9/1958 | Gahwyler ................ 60/746 |
| 4,271,675 | A | * | 6/1981 | Jones et al. .............. 60/737 |
| 4,408,461 | A | * | 10/1983 | Bruhwiler et al. ........... 60/737 |
| 4,589,260 | A | | 5/1986 | Krockow |
| 4,598,553 | A | * | 7/1986 | Saito et al. ............... 60/733 |
| 4,701,124 | A | * | 10/1987 | Maghon et al. ............ 431/284 |
| 4,850,194 | A | * | 7/1989 | Fuglistaller et al. .......... 60/737 |
| 5,016,443 | A | * | 5/1991 | Shimizu et al. ............ 60/737 |
| 5,062,792 | A | * | 11/1991 | Maghon ................ 431/284 |
| 5,267,851 | A | | 12/1993 | Washam et al. |
| 5,351,477 | A | * | 10/1994 | Joshi et al. ............. 60/39.463 |
| 5,628,192 | A | * | 5/1997 | Hayes-Bradley et al. ...... 60/733 |
| 5,638,682 | A | | 6/1997 | Joshi et al. |

(Continued)

FOREIGN PATENT DOCUMENTS

| | | |
|---|---|---|
| EP | 1321715 A2 | 6/2003 |
| WO | WO 2007/033306 A2 | 3/2007 |

OTHER PUBLICATIONS

International Preliminary Report on Patentability, PCT/IB2006/004251, Rolls-Royce Power Engineering PLC, The International Bureau of WIPO, Feb. 3, 2009.

(Continued)

*Primary Examiner* — Gerald L Sung
(74) *Attorney, Agent, or Firm* — Krieg DeVault LLP

(57) ABSTRACT

One embodiment is a gas turbine engine premix injector including a mixing duct, a plurality of air inlet slots leading to the duct, a plurality of gaseous fuel inlet apertures leading to the duct, a plurality of vanes positioned in the duct downstream from said air inlets, a plurality of liquid fuel inlet apertures leading to the duct, and a plurality of discharge windows positioned between the vanes.

21 Claims, 8 Drawing Sheets

(56) References Cited

U.S. PATENT DOCUMENTS

| | | | |
|---|---|---|---|
| 5,660,044 A * | 8/1997 | Bonciani et al. | 60/737 |
| 5,660,045 A * | 8/1997 | Ito et al. | 60/737 |
| 5,829,967 A | 11/1998 | Chyou | |
| 5,927,076 A | 7/1999 | Pillsbury | |
| 6,070,411 A * | 6/2000 | Iwai et al. | 60/737 |
| 6,092,363 A | 7/2000 | Ryan | |
| 6,126,439 A | 10/2000 | Knopfel et al. | |
| 6,442,939 B1 | 9/2002 | Stuttaford et al. | |
| 6,532,742 B2 | 3/2003 | Scarinci et al. | |
| 6,599,121 B2 | 7/2003 | Gutmark et al. | |
| 6,698,206 B2 | 3/2004 | Scarinci et al. | |
| 6,698,207 B1 * | 3/2004 | Wiebe et al. | 60/737 |
| 6,732,527 B2 | 5/2004 | Freeman et al. | |
| 6,761,033 B2 | 7/2004 | Inoue et al. | |
| 7,137,258 B2 * | 11/2006 | Widener | 60/776 |
| 7,143,583 B2 * | 12/2006 | Hayashi et al. | 60/776 |
| 2002/0162333 A1 | 11/2002 | Zelina | |
| 2003/0221431 A1 | 12/2003 | Rock | |
| 2004/0011055 A1 | 1/2004 | Inoue et al. | |
| 2004/0055307 A1 | 3/2004 | Knoepfel | |
| 2004/0154301 A1 | 8/2004 | Freeman et al. | |
| 2005/0034444 A1 | 2/2005 | Sanders | |

OTHER PUBLICATIONS

International Search Report, PCT/IB2006/004251, Rolls-Royce Power Engineering plc, Jan. 19, 2009.

* cited by examiner

GAS TURBINE ENGINE PREMIX INJECTORS

CROSS-REFERENCE TO RELATED APPLICATIONS

The present application claims the benefit of U.S. Provisional Patent Application No. 60/750,168 filed Dec. 14, 2005, which is incorporated herein by reference.

TECHNICAL FIELD

The technical field relates generally to gas turbine engine fuel injectors, and more particularly, but not exclusively, to premix injectors for industrial gas turbine engines.

BACKGROUND

Gas turbine engines are an efficient source of useful energy and have proven reliable for electricity generation, as well as for other uses. Gas turbine engines may include premix injectors for providing a mixture of air and fuel for combustion. Many gas turbine engine premix injectors suffer from a number limitations, and drawbacks, for example, those respecting size, complexity, part count, emissions, and others. Thus, there is a need for the unique and inventive premix injectors disclosed herein.

SUMMARY

One embodiment is a gas turbine engine premix injector including a mixing duct, a plurality of air inlet slots leading to the duct, a plurality of gaseous fuel inlet apertures leading to the duct, a plurality of vanes positioned in the duct downstream from said air inlets, a plurality of liquid fuel inlet apertures leading to the duct, and a plurality of discharge windows positioned between the vanes. Further embodiments, forms, objects, features, advantages, aspects, and benefits of the present invention shall become apparent from the following description and drawings.

DETAILED DESCRIPTION

Figure 1:
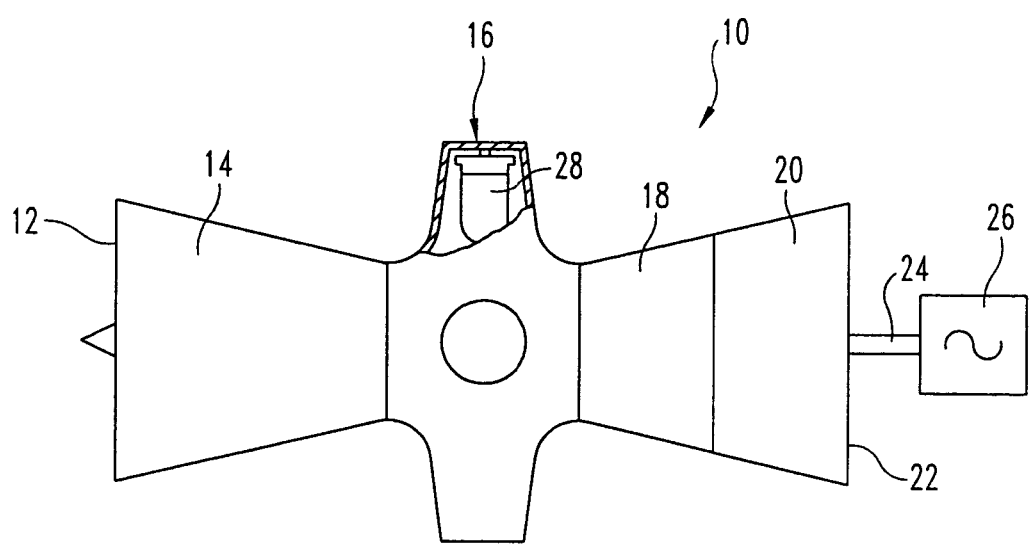
FIG. 1 is a schematic representation of one embodiment of a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated an industrial gas turbine engine 10, including, an inlet 12, a compressor section 14, a combustor section 16, a turbine section 18, a power turbine section 20 and an exhaust 22. Turbine section 18 is arranged to drive the compressor section 14 and power turbine section 20 drives an electrical generator 26 via a shaft 24. Furthermore, power turbine section 20 may be arranged to provide drive for other applications. It should be understood that industrial gas turbine engine 10 is a non-limiting embodiment and that a variety of other gas turbine engine configurations are also contemplated herein including, for example, gas turbine engines suitable for propulsion of aircraft including helicopters, airplanes, missiles, unmanned space devices and other similar devices, gas turbine engines suitable for pumping sets for oil and gas transmission lines, and as prime movers in a marine propulsion system. The operation of gas turbine engines is considered conventional and will not be discussed further as it is believed known to one of ordinary skill in the art.

With continuing reference to FIG. 1, combustor section 16 includes a number of combustion chambers, such as combustion chamber 28 which is illustrated generically in the cutaway portion of FIG. 1. In one form the combustor section 16 is a low emissions combustor system that utilizes the premixing of fuel and air to obtain a lean combustionable mixture which prevents the formation of harmful emissions. During operation of gas turbine engine 10, fuel and air are combusted in combustion chamber 28. It should be understood that the term air broadly refers to the full range of working fluids that may be utilized by gas turbine engines. The hot gaseous products of combustion pass to turbine sections 18 and 20 which drive other sections of gas turbine engine 10 and/or other loads, for example, those described above. In one embodiment, gas turbine engine 10 is operable using gaseous and/or liquid fuel. In other embodiments gas turbine engine 10 is operable using only gaseous fuel or only liquid fuel. Non-limiting examples of liquid fuels include kerosene and aviation fuel, and non-limiting examples of gaseous fuel include natural gas as well as other gaseous hydrocarbons.

Figure 2:
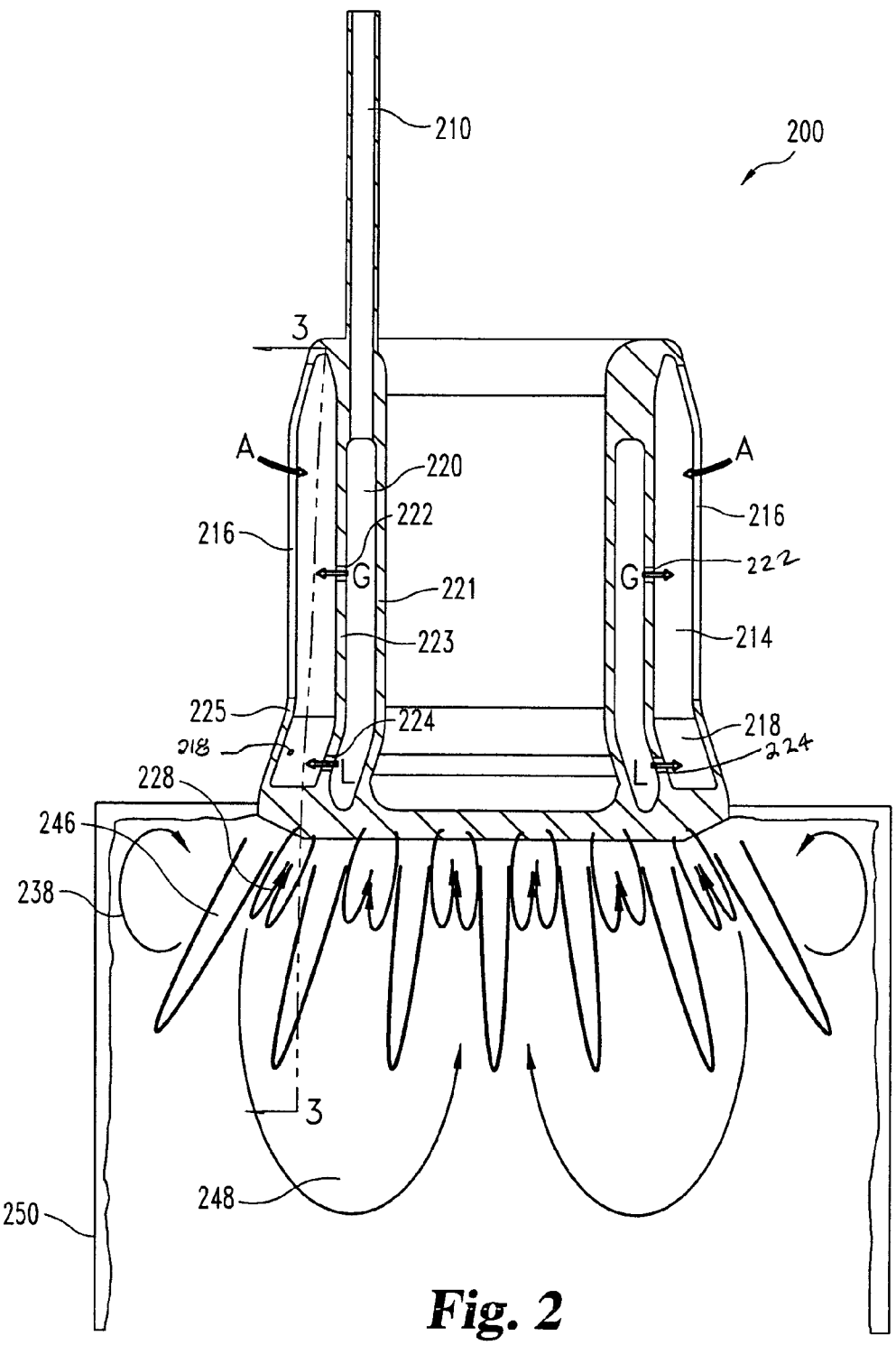
FIG. 2 is sectional view of one embodiment of a premix injector, a combustion chamber, and a combustion reaction within the chamber.

With reference to FIG. 2, there is illustrated one embodiment of a premix injector 200. Premix injector 200 includes a fuel manifold 220 which is supplied with gaseous or liquid fuel by fuel inlet pipe 210 from a fuel supply (not illustrated). Fuel manifold 220 is substantially annular and is bordered by inner wall member 221 and middle wall member 223. Premix injector 200 further includes a fuel-air mixing duct 214 which is substantially annular and is bordered by middle wall member 223 and an outer wall member 225. A number of inlet slots 216 in outer wall member 225 allow air to flow into fuel air mixing duct 214 as is indicated by arrows A. A plurality of circumferentially spaced gaseous fuel inlet apertures 222 in middle wall member 223 allow gaseous fuel to enter fuel air mixing duct 214 as is indicated by arrows G, and a plurality of liquid fuel inlet apertures 224 in middle wall member 223 allow liquid fuel to enter fuel air mixing duct 214 as is indicated by arrows L.

Fuel enters fuel air mixing duct 214 and mixes with air flowing therein. The fuel-air mixture flows through fuel air mixing duct 214 toward a plurality of spaced apart vanes 218 which divide the fuel air mixing duct 214 into a plurality of discrete outlet flow paths. The flowing fuel air mixture is divided into a number of discrete outlet flow streams of the fuel air mixture.

The vanes 218 reduce the exit area of the fuel-air mixing duct 214 prior to the combustor and accelerated flow to prevent flashback. The vanes 218 are preferably of an aerodynamic shape, however, other shapes and structures at the exit area of the fuel-air mixing duct 214 are contemplated herein. The present description utilizes the term vane to cover aerodynamic and non-aerodynamic structures unless specifically provided to the contrary.

Each outlet flow stream exits premix injector 200 through an outlet window leading to combustion chamber 250 where combustion occurs as a number of discrete flames 246. Flames 246 are stabilized by recirculation zone 228 intermediate each flame, by recirculation zone 248 in the central region of the combustion chamber, and by recirculation zone 238 around the periphery of flames 246. Vanes 218 direct and accelerate flow exiting premix injector 200. Flames 246 are preferably discrete regions of combustion having a substantially elongate cone shape. The elongate cone shape results in a relatively large flame area which contributes to a more rapid and complete combustion process. The fuel air mixture exiting the premix injector 200 is preferably a lean combustible mixture.

The number and position of fuel inlet apertures may vary from the illustrated embodiments. Preferably, the gaseous fuel inlet apertures are located along the length of the inlet slots, most preferably in the bottom two thirds of the length of the inlet slots. There can be more than one gaseous fuel aperture located along the length of each inlet slot or in the spaces between inlet slots. Preferably, the liquid fuel inlet apertures are located downstream from the inlet slots in the region between vanes. Certain embodiments may include only gaseous fuel inlet apertures. Other embodiments may include only liquid fuel inlet apertures. Further embodiments contemplate different shapes, numbers, locations and arrangements of fuel inlet apertures.

Figure 3:
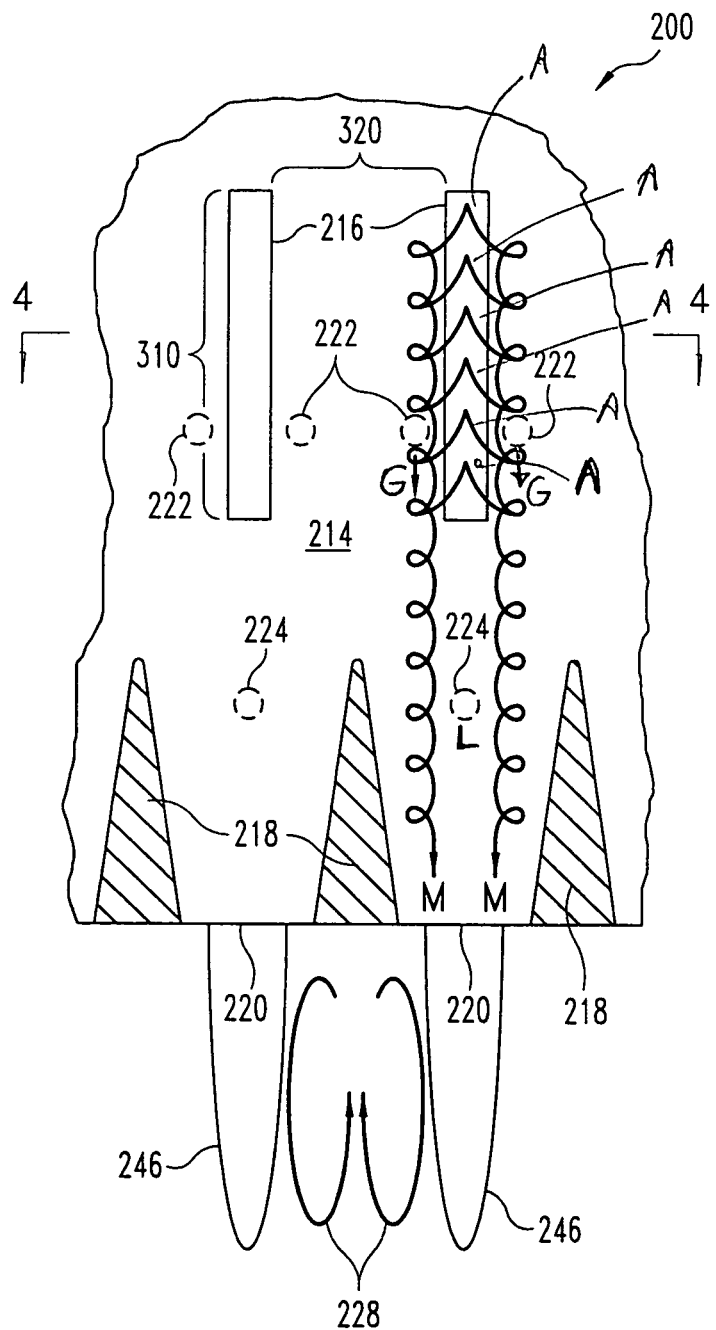
FIG. 3 is a view of a portion of FIG. 2 taken along line 3-3 in FIG. 2.

With reference to FIG. 3, there is illustrated a portion of premix injector 200 taken along line 3-3 in FIG. 2. As indicated by arrows A, air flowing into fuel air mixing duct 214 from inlet slots 216 forms a pair of vortex flows which flow from inlet slots 216 toward vanes 218. Inlet slots 216 extend along a portion of the axial length of premix injector 200 and preferably admit air flow in a substantially radial or perpendicular direction. The inlet slots 216 extend along the direction of flow within the fuel air mixing duct 214. Inlet slots 216 are illustrated as having a generally rectangular shape; however, they may also have other shapes, for example, a tapered shape having greater width toward vanes 218. Inlet slots 216 have a length 310 which is preferably selected to satisfy the inequality $$\frac{fL}{U} \geq 1$$

where f is the frequency of the lowest acoustic mode of a combustion chamber to which premix injector 200 is fluidly coupled, L is slot length, and U is the average velocity of air in the fuel air mixing duct 214 at the point of inlet slot termination, which is located at the end of the inlet slot closest to vanes 218. Inlet slots 216 are spaced apart by a distance 320. The configuration of inlet slots 216, fuel inlet apertures 222, 224 and vanes 218 continues about premix injector 200. It should be appreciated that a variety of numbers of inlet slots and associated vanes, and discharge windows are contemplated. Preferably, there are six or more discharge windows and associated vanes, and inlet slots. In one form each of the vanes acts as a flame holder and functions to stabilize the flame from all four sides of the window. In certain embodiments there are as many as twenty to fifty or more discharge windows and associated vanes and inlet slots. In one form there is included a discharge window for each inlet slot.

As indicated by arrows G, jets of gaseous fuel enter fuel air mixing duct 214 through gaseous fuel inlet apertures 222 and are rapidly mixed with the vortex flow. In one form the rapid mixing of the fuel and air is in the sub-millisecond range, however other mixing times are contemplated herein. As indicated by arrows L jets of liquid fuel enter fuel air mixing duct 214 through liquid fuel inlet apertures 224 and are rapidly atomized and mixed with the vortex flow. Mixing of the liquid fuel preferably involves airblast atomization to break up and disperse fuel droplets. The size and location of the liquid fuel apertures are preferably selected so that that liquid fuel jets exiting the apertures satisfy the inequality $(We)(MFR)^{5/4} \geq 8000$ where We is the Weber number based on the diameter of the liquid fuel jet and MFR is the momentum flux ratio of the liquid fuel jet. In one non-limiting embodiment the location of the liquid fuel inlet aperture is where the fluid flowing within the fuel air mixing duct has a velocity greater than 50 meters/second.

As indicated by arrows M, the mixture of fuel and air exits premix injector 200 at windows 220 which are located intermediate vanes 218. During combustion, exit windows 220 provide flow to a number of discrete flames 246 located intermediate recirculation flows 228. It should be appreciated that the description of FIG. 3 applies to each of the inlet slots 216, gaseous fuel inlet apertures 222, liquid fuel inlet apertures 224, vanes and windows 220 of premix injector 200, although certain features are illustrated for only certain inlet slots 216, gaseous fuel inlet apertures 222, liquid fuel inlet apertures 224, vanes, or windows 220 for the sake of clarity and simplicity.

Figure 4:
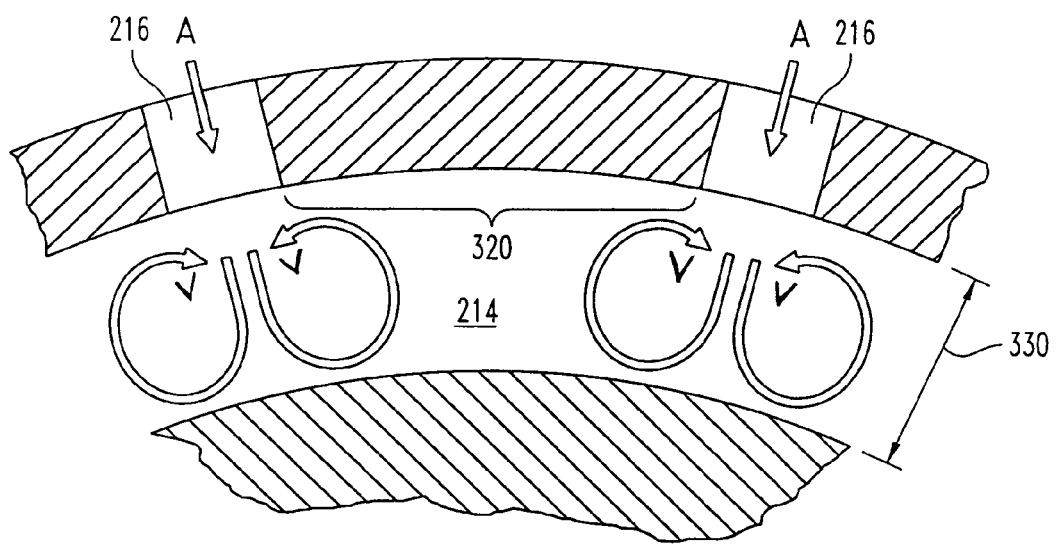
FIG. 4 is a view of a portion of FIG. 3 taken along line 4-4 in FIG. 3.

With reference to FIG. 4, there is illustrated a portion of premix injector 200 taken along line 4-4 in FIG. 3. As indicated by arrows A air flow enters fuel air mixing duct 214 through inlet slots 216 to produce pairs of vortex flow indicated by arrows V. The pair of vortex flow is counter rotating and result in very rapid mixing of the fuel and air. In one form the vortex flow defines streamwise vortices that are used for flame stabilization within the combustion chamber. The distance 320 between inlet slots 216 is preferably selected to be between 1.5 to 3 times the height 330 of fuel air mixing duct 214. In one embodiment the distance 320 between inlet slots 216 is approximately 2 times the height 330 of fuel air missing duct 214. However, other distances between the inlet slots are contemplated herein.

Figure 5:
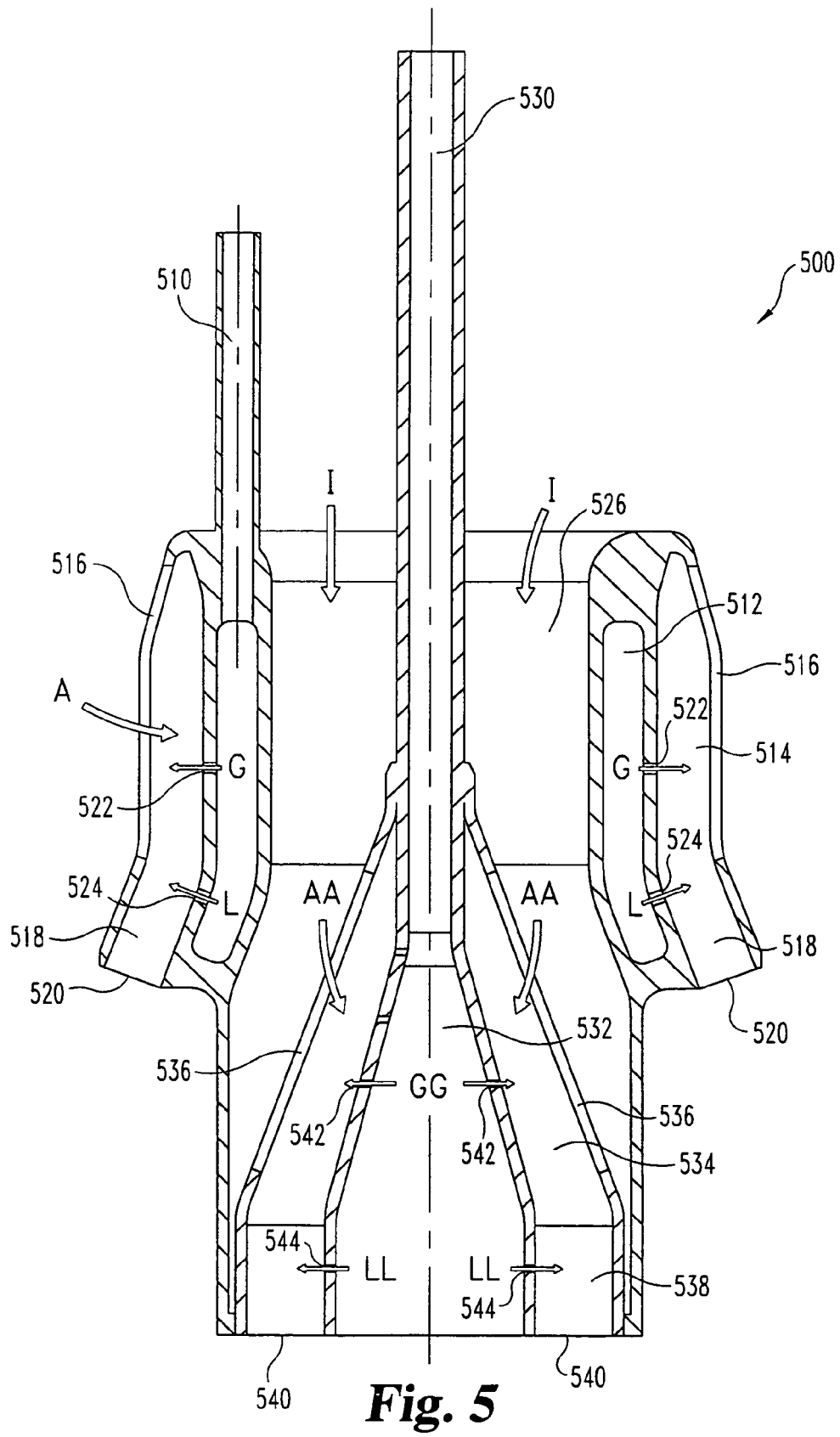
FIG. 5 is a sectional view of one embodiment of a premix injector.

With reference to FIG. 5, there is illustrated one embodiment of a two stage premix injector 500. The primary stage of the premix injector 500 includes in one embodiment a substantially annular primary fuel manifold 512 to which gaseous or liquid fuel is supplied via a primary fuel supply pipe 510. Primary fuel supply pipe 510 is in flow communication with a fuel source (not illustrated). The primary stage of premix injector 500 includes a substantially annular primary air-fuel mixing duct 514. Gaseous fuel enters primary air-fuel mixing duct 514 through primary gaseous fuel inlet apertures 522 as indicated by arrows G. Liquid fuel enters primary air-fuel mixing duct 514 through primary liquid fuel inlet apertures 524 as indicated by arrows L. Inlet slots 516 allow air to flow into duct 514 as indicated by arrows A. As was described above in connection with FIGS. 2-4, inlet slots 516 produce vortex flows in primary air-fuel mixing duct 514 which contribute to fuel-air mixing. The characteristics and dimensions of inlet slots 516, primary gaseous fuel inlet apertures 522, primary liquid fuel inlet apertures 524 and other features of the primary stage of premix injector 500 can be designed the same or similar to those of inlet slots 216, gaseous fuel inlet apertures 222, liquid fuel inlet aperture 224 and other features of premix injector 200 discussed above in connection with FIGS. 2-4. The air fuel mixture flows through primary air-fuel mixing duct 514 to vanes 518 which direct the flow through discharge windows 520 which are located intermediate vanes 518.

The secondary stage of premix injector 500 includes a secondary fuel manifold 532 to which gaseous or liquid fuel is supplied via secondary fuel supply pipe 530. The secondary stage of premix injector 500 includes a substantially annular secondary air-fuel mixing duct 534. Gaseous fuel enters secondary air-fuel mixing duct 534 through secondary gaseous fuel inlet apertures 542 as indicated by arrows GG. Liquid fuel enters secondary air-fuel mixing duct 534 through secondary liquid fuel inlet apertures 544 as indicated by arrows LL. Air flows to secondary air inlet passage 526 as indicated by arrows I, and inlet slots 536 allow air to flow into secondary air-fuel mixing duct 534 as indicated by arrows AA. As was described above in connection with FIGS. 2-4, inlet slots 536 produce vortex flows in secondary air-fuel mixing duct 534 which contribute to fuel-air mixing. The characteristics and dimensions of inlet slots 536, secondary gaseous fuel inlet apertures 542, secondary liquid fuel inlet apertures 544 and other features of the secondary stage of premix injector 500 can be the same or similar to those of inlet slots 216, gaseous fuel inlet apertures 222, liquid fuel inlet apertures 224 and other features of premix injector 200 discussed above in connection with FIGS. 2-4. The air-fuel mixture flows through secondary air fuel mixing duct 534 to vanes 538 which direct the fluid flow through discharge windows 540 which are located intermediate vanes 538.

Figure 6:
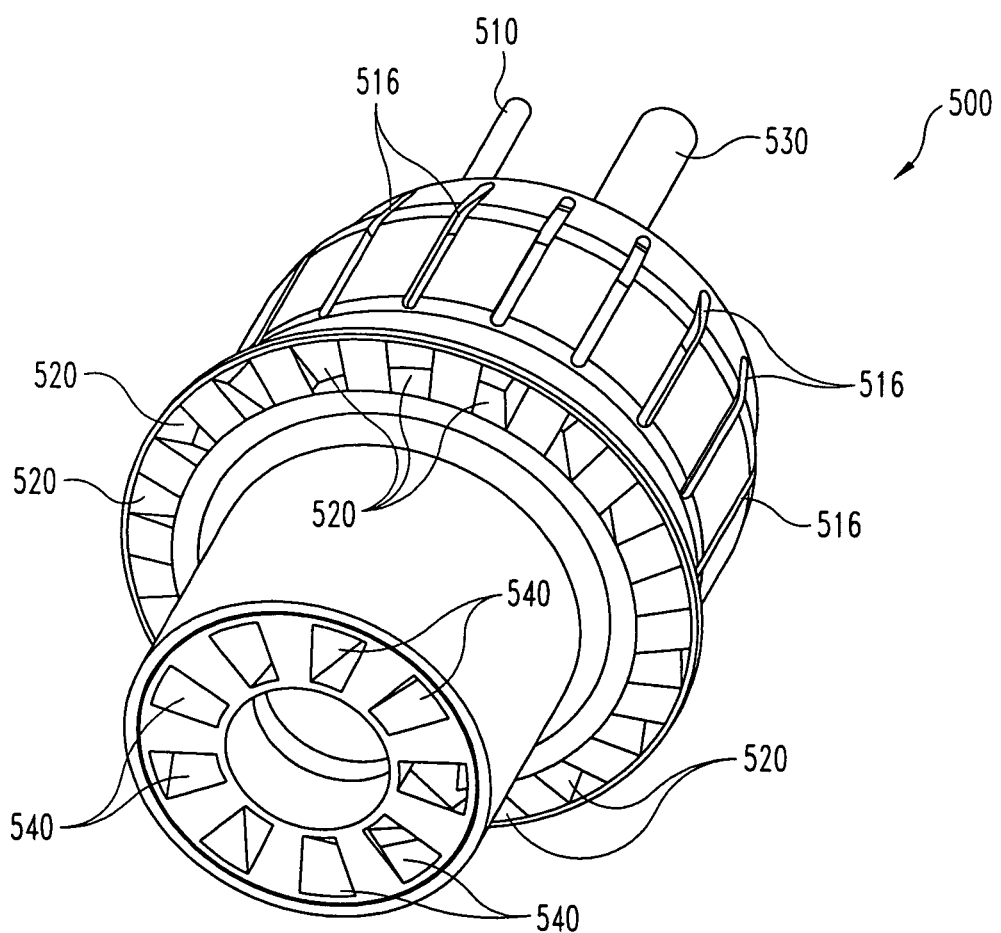
FIG. 6 is a perspective view of the premix injector of FIG. 5.
Figure 7:
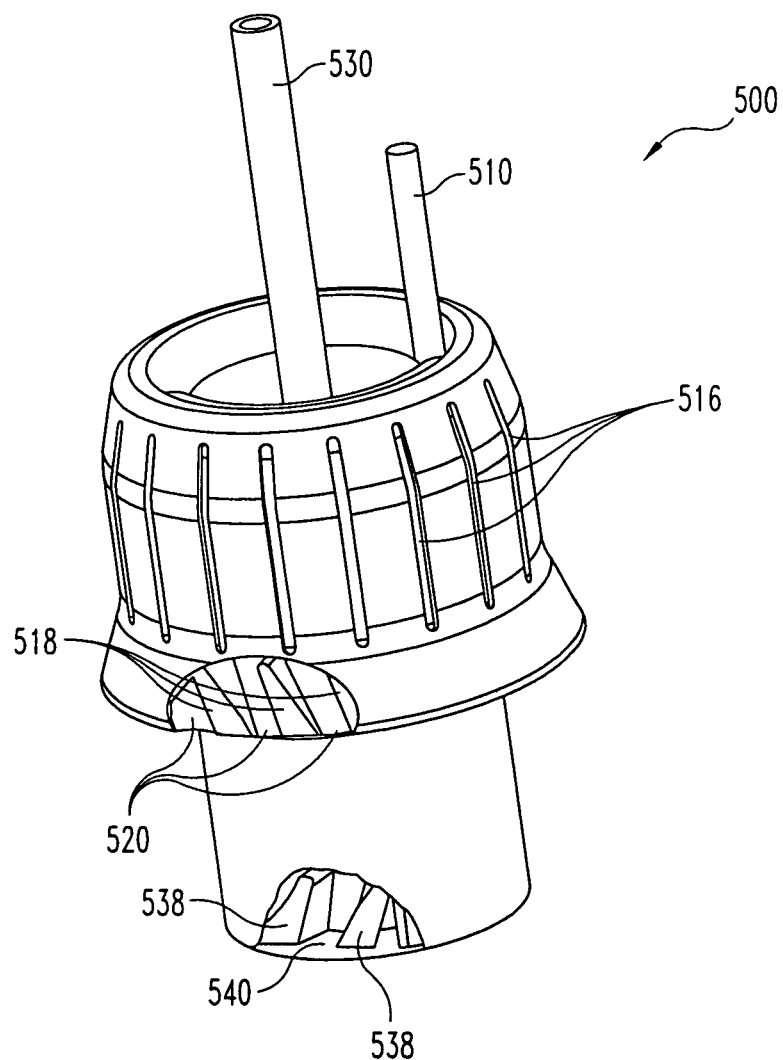
FIG. 7 is a perspective, partial cutaway view of the premix injector of FIG. 5.

With reference to FIG. 6, there is illustrated a perspective view of premix injector 500. In the illustrated embodiment discharge windows 540 are located radially inward from and axially downstream from discharge windows 520. With reference to FIG. 7, there is illustrated a perspective partial cutaway view of premix injector 500. In the illustrated embodiment, vanes 518 and 538 are angled to impart an overall swirl to the output of discharge windows 520 and 540, respectively, and are angled outward from the axial centerline of premix injector 500 to be diverging from one another.

Figure 8:
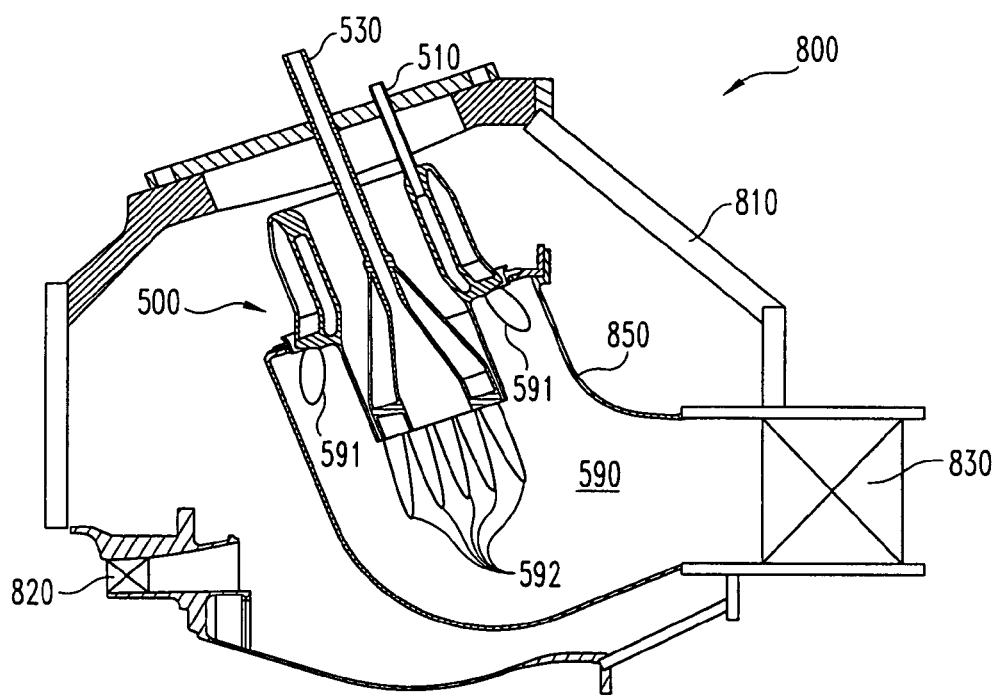
FIG. 8 is a sectional view of one embodiment of a gas turbine engine combustor section including the premix injector of FIG. 5.

With reference to FIG. 8 there is illustrated an exemplary embodiment of a gas turbine engine combustor section 800 including premix injector 500 which was described above. Combustor section 800 includes casing 810, and inlet 820 which supplies compressed air from the compressor section. Compressed air and fuel are provided to premix injector 500 as described above. Combustor liner 850 defines combustion chamber 590 in which primary flames 591 and secondary flames 592 combust a fuel-air mixture from premix injector 500. FIG. 8 illustrates a silo type combustion chamber. It should be appreciated, however, that a variety of other types of combustion chambers are contemplated, including can type, annular type, and can-annular type combustions chambers as well as others. The present application contemplates the ability to control fuel delivery to the entire premix injector or sub-portions thereof.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine premix injector comprising:
a mixing duct;
a plurality of air inlet slots leading to said mixing duct;
a plurality of gaseous fuel inlet apertures leading to said mixing duct;
a plurality of members positioned in said mixing duct downstream from said plurality of gaseous fuel inlet apertures for dividing fluid flow within said mixing duct; and
a plurality of liquid fuel inlet apertures positioned in said mixing duct; and
wherein said air inlet slots are formed in a first surface of said mixing duct, said gaseous fuel inlet apertures are formed in a second surface of said mixing duct opposite said first surface, and the first surface and the second surface forming an annular space defined between walls having the first surface and second surface downstream of the plurality of air inlet slots.

2. The injector of claim 1 wherein said plurality of members define a plurality of vanes.

3. The injector of claim 2 wherein each of said plurality of vanes is aerodynamically shaped.

4. The injector of claim 2 wherein said mixing duct is substantially annular and the ratio of distance between adjacent slots to height of the mixing duct is between 1.5 and 3.

5. The injector of claim 2 in flow communication with a combustion chamber, wherein the length of each of said slots satisfies $$\frac{fL}{U} \geq 1$$

where f is the frequency of the lowest acoustic mode of the combustion chamber, L is slot length, and U is the average velocity of air in said mixing duct at the point of slot termination.

6. The injector of claim 2 wherein said liquid fuel inlet apertures are positioned to direct a fuel jet intermediate pairs of said plurality of vanes.

7. The injector of claim 2 wherein the size and location of said liquid fuel apertures are selected such that liquid fuel jets exiting said apertures satisfy $(We)(MFR)^{5/4} \geq 8000$ where We is the Weber number based on the diameter of the liquid fuel jet and MFR is the momentum flux ratio of the liquid fuel jet.

8. The injector of claim 1 further comprising:
a second mixing duct positioned radially inward from said duct;

a second plurality of air inlet slots leading to said second duct;

a second plurality of gaseous fuel inlet apertures leading to said second duct;

a second plurality of members positioned in said duct downstream from said air inlets;

a second plurality of liquid fuel inlet apertures leading to said second duct; and wherein said plurality of members and said second plurality of members are vanes.

9. An apparatus comprising:

a gas turbine engine premix injector including a mixing duct;

a plurality of air inlet slots, each of said inlet slots providing a vortex flow to said mixing duct;

a plurality of fuel inlets providing fuel to said mixing duct;

a plurality of vanes positioned in said mixing duct and located downstream of a generation of the vortex flow provided by the plurality of air inlet slots;

a first plurality of outlet windows;

said vanes directing fluid flow to said outlet windows.

10. The apparatus of claim 9 wherein said plurality of fuel inlets are liquid fuel inlets positioned to provide fuel jets intermediate said vanes.

11. The apparatus of claim 9 wherein said plurality of fuel inlets are gaseous fuel inlets defined in a surface of said mixing duct.

12. The apparatus of claim 9 wherein said plurality of fuel inlets are gaseous fuel inlets and further comprising a plurality of liquid fuel inlets.

13. The apparatus of claim 9 wherein fluid flow streams from said first plurality of outlet windows diverge from one another.

14. The apparatus of claim 9 further comprising a second plurality of outlet windows positioned radially inward from and downstream from said first plurality of outlet windows.

15. The apparatus of claim 9 wherein each of said air inlet slots generates two vortex flows within said mixing duct.

16. A gas turbine engine combustion system comprising:

a premix injector including a primary stage, said primary stage including an air-fuel mixing duct, a plurality of inlet air flows to said air-fuel mixing duct, a plurality of fuel jets to said air-fuel mixing duct, and a plurality of vanes that together define a plurality of outlet windows, each outlet window providing a lean combustible fluid flow to a discrete flame associated with each window such that a plurality of discrete flames are formed, wherein each spans between downstream walls of adjacent vanes and each downstream wall having a circumferential width sufficient to create a discrete outlet flow to create the plurality of discrete flames.

17. The system of claim 16 further comprising a plurality of means for mixing fuel and air.

18. The system of claim 16 further comprising a plurality of means for routing flow to said outlet windows.

19. The system of claim 16 further comprising a plurality of means for providing a lean combustible mixture of liquid fuel and air.

20. The system of claim 16 further comprising a combustion chamber in flow communication with said premix injector.

21. The system of claim 20 wherein the premix injector further includes a secondary stage, the premix injector is flow coupled to a gas turbine engine compressor stage, and the combustion products from the primary stage and the secondary stage are flow coupled to a turbine section of a gas turbine engine.

* * * * *